(12) United States Patent
Chen et al.

(10) Patent No.: US 12,404,150 B2
(45) Date of Patent: Sep. 2, 2025

(54) FULL-TIME ANTI-SWAY CONTROL METHOD OF BRIDGE CRANE SYSTEM BASED ON INVERTER STRUCTURE

(71) Applicant: Delta Electronics, Inc., Taoyuan (TW)

(72) Inventors: Wan-Ping Chen, Taoyuan (TW); Chun-Ju Wu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 395 days.

(21) Appl. No.: 17/491,982

(22) Filed: Oct. 1, 2021

(65) Prior Publication Data

US 2022/0227604 A1 Jul. 21, 2022

Related U.S. Application Data

(60) Provisional application No. 63/138,640, filed on Jan. 18, 2021.

(30) Foreign Application Priority Data

Sep. 14, 2021 (CN) .......................... 202111074834.3

(51) Int. Cl.
*G06F 7/70* (2006.01)
*B66C 13/06* (2006.01)
*B66C 13/46* (2006.01)
*G05B 13/04* (2006.01)

(52) U.S. Cl.
CPC ............ *B66C 13/063* (2013.01); *B66C 13/46* (2013.01); *G05B 13/042* (2013.01); *B66C 2700/084* (2013.01); *G05B 2219/41217* (2013.01)

(58) Field of Classification Search
CPC . B66C 13/063; B66C 13/46; B66C 2700/084; G05B 13/042; G05B 2219/41217
See application file for complete search history.

(56) References Cited

U.S. PATENT DOCUMENTS

| | | | | |
|---|---|---|---|---|
| 2014/0224755 | A1* | 8/2014 | Eriksson | ................. G01C 9/08 700/228 |
| 2020/0073320 | A1* | 3/2020 | Ishida | ................ G03G 21/1614 |
| 2020/0386605 | A1* | 12/2020 | Oren | ..................... B66F 17/006 |

FOREIGN PATENT DOCUMENTS

JP 10202010571 * 10/2020

* cited by examiner

*Primary Examiner* — Adam M Alharbi
(74) *Attorney, Agent, or Firm* — Chun-Ming Shih; HDLS IPR SERVICES

(57) ABSTRACT

A full-time anti-sway control method of a bridge crane system based on an inverter structure includes steps of: receiving a specified high frequency and a frequency change time, calculating a time setting range according to a plurality of system parameters and a rope length information of the bridge crane system, selecting a time setting value within the time setting range, dividing the frequency change time into a plurality of time intervals according to the time setting value, adjusting an operation frequency command to change between a low frequency and the specified high frequency within the plurality of time intervals to generate a frequency change curve, calculating a frequency correction amount according to the frequency change curve and the rope length information, and superimposing the frequency change curve and the frequency correction amount to generate an anti-sway frequency command to drive the at least one motor.

14 Claims, 11 Drawing Sheets

FULL-TIME ANTI-SWAY CONTROL METHOD OF BRIDGE CRANE SYSTEM BASED ON INVERTER STRUCTURE

CROSS-REFERENCE TO RELATED APPLICATION

This patent application claims the benefit of U.S. Provisional Patent Application No. 63/138,640, filed Jan. 18, 2021, which is incorporated by reference herein.

BACKGROUND

Technical Field

The present disclosure relates to a full-time anti-sway control method of a bridge crane system, and more particularly to a full-time anti-sway control method of a bridge crane system based on an inverter structure.

Description of Related Art

Bridge (overhead) cranes have been widely used in industrial assembly and transportation applications. A typical bridge crane structure includes a crane bridge, a crane trolley, and a hoist that moves up and down in a Z direction so that the hanging objects move to the designated position by the operation of the crane bridge and the crane trolley. However, during the operation process, the hanging object will inevitably sway due to the speed change of the crane bridge and/or the crane trolley, which affects work efficiency and increases work safety problems.

The anti-sway function for crane is suitable for indoor bridge crane facilities, which is used in the inverter structure of the crane bridge (in an X direction) and the crane trolley (in a Y direction). When the hoist suspends heavy objects and moves in the X or Y direction, the anti-sway function is activated/enabled to eliminate unnecessary swaying during the moving process, reduce the occurrence of hazards, increase production capacity, and achieve better bridge crane control benefits. Under the same number of operations, the operation time is a Gaussian distribution.

Many references have proposed related anti-sway technologies. Based on cost considerations, most of the anti-sway technologies use a swing angle estimator to replace an image identifier or (swing) angle sensor. Since the anti-sway controller adopts the design of state feedback, the design of the estimator and the state controller requires a large number of system parameters to be set. In practical applications, therefore, the system parameters are difficult to be measured and difficult to be acquired so as to increase the trouble of use.

Since it is necessary to estimate the speed of the crane bridge and the crane trolley as well as to set system parameters in terms of angle estimation, the use of motor position sensor is necessary. However, for low-cost system configurations, the motor may not be equipped with an encoder or Hall sensor, and even additional installation of the encoder or Hall sensor will increase the cost of mechanism design and hardware configuration, and also increase the difficulty of implementation.

In order to solve the above technical difficulties, the present disclosure proposes the full-time anti-sway control method of the bridge crane system based on the inverter structure, which is simple, easy to implement, without requiring a motor position sensor, and having low-cost hardware configuration.

SUMMARY

An object of the present disclosure is to provide a full-time anti-sway control method of a bridge crane system based on an inverter structure to solve the problems of existing technology.

In order to achieve the object of the present disclosure, the bridge crane system includes an inverter for performing the control method and at least one motor controlled by the control method. The control method includes steps of: receiving a specified high frequency and a frequency change time, calculating a time setting range according to a plurality of system parameters and a rope length information of the bridge crane system, selecting a time setting value within the time setting range, dividing the frequency change time into a plurality of time intervals according to the time setting value, adjusting an operation frequency command to change between a low frequency and the specified high frequency within the plurality of time intervals to generate a frequency change curve, calculating a frequency correction amount according to the frequency change curve and the rope length information, and superimposing the frequency change curve and the frequency correction amount to generate an anti-sway frequency command to drive the at least one motor.

In order to achieve the object of the present disclosure, the bridge crane system includes an inverter for performing the control method and at least one motor controlled by the control method. The control method includes steps of: receiving a specified high frequency and a frequency change time, calculating a time setting range according to a plurality of system parameters and a rope length information of the bridge crane system, selecting a time setting value within the time setting range, dividing the frequency change time into a plurality of time intervals according to the time setting value, adjusting an operation frequency command to change between a low frequency and the specified high frequency within the plurality of time intervals to generate a frequency change curve, acquiring a rotation angle of the at least one motor by the position sensor, estimating a swing angle and a swing speed of a bridge crane under a simple pendulum movement according to the rotation angle to calculate a frequency correction amount, and superimposing the frequency change curve and the frequency correction amount to generate an anti-sway frequency command to drive the at least one motor.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows:

FIG. 12 is a structure diagram of an anti-sway frequency controller having the drive mode switch according to the present disclosure.

DETAILED DESCRIPTION

Figure 1:
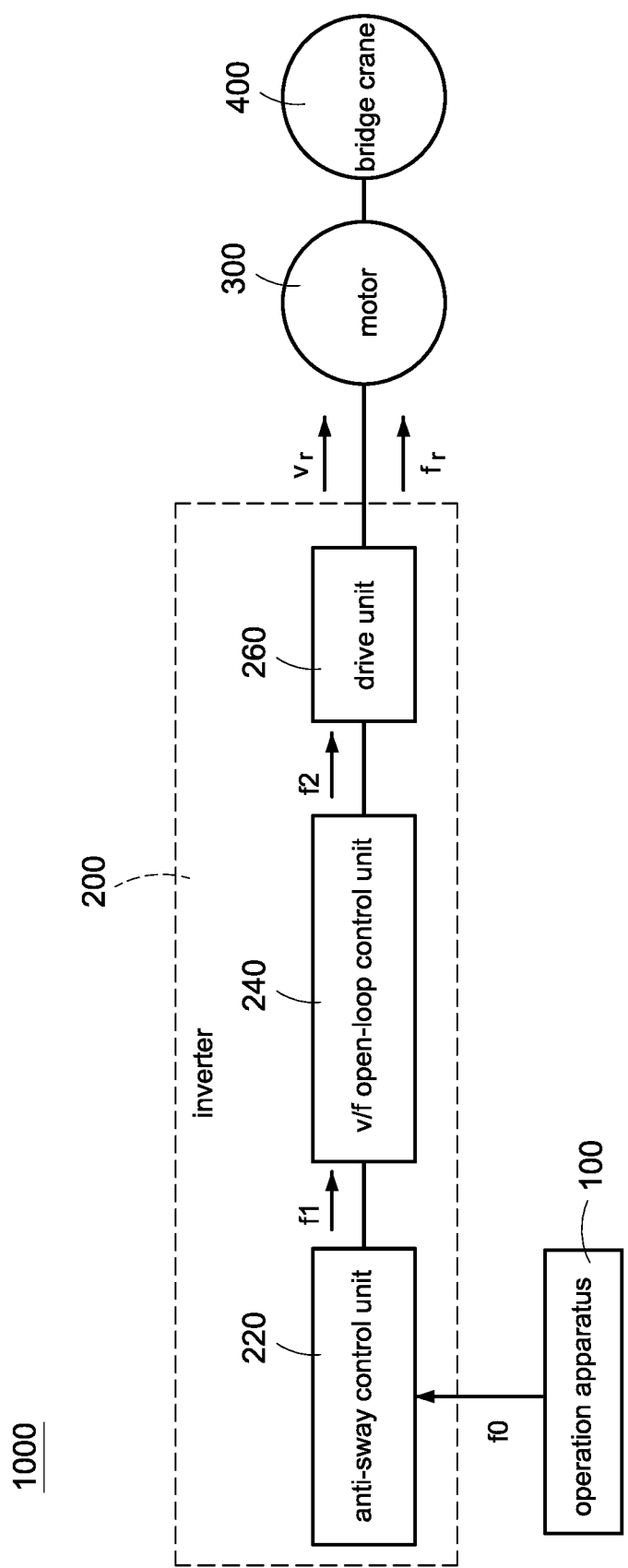
FIG. 1 is a structure diagram of a full-time anti-sway control of a bridge crane system according to a first embodiment of the present disclosure.

Reference will now be made to the drawing figures to describe the present disclosure in detail. It will be understood that the drawing figures and exemplified embodiments of present disclosure are not limited to the details thereof. The present disclosure provides a full-time anti-sway control method of a bridge crane system, and the function of the method is based on an inverter, and the method has the following characteristics and functions.

Regardless of whether there is a motor position sensor or not, the anti-sway function can be completed without a swing angle sensor, and the construction cost is low. That is, no motor position sensor and swing angle sensor/image recognizer are needed, and the construction cost is low.

Only the rope length information is required, and the dependence on the parameters of the crane and motor system is low, and it is easy to implement. That is, there is no need to highly rely on system parameters such as the weight of the crane bridge and the crane trolley, the weight of the suspended objects, the wheel diameter, and the reduction ratio, and it is easy to implement.

In the crane bridge structure, if the inverter is used to drive two motors, simple v/f (voltage/frequency) control can also be used to achieve anti-sway function. That is, the v/f motor control method is suitable for one-to-many structure (multiple motors driven by one inverter), and it has high versatility.

The anti-sway frequency generator is generated all-time, regardless of the general travel (normal acceleration and deceleration in one direction), repeated inching (repeated acceleration and deceleration in one direction), repeated forward and reverse rotation (repeated forward movement and reverse movement) can achieve the anti-sway effect before the crane stops. That is, the full-time anti-sway control is suitable for all working conditions of the crane operation, and it has high versatility.

The control parameters can be automatically adjusted without repeated tests according to the intensity setting by the user. That is, it can perform full-time anti-sway and high control freedom.

Please refer to FIG. 1. The bridge crane system 1000 includes an operation apparatus 100, an inverter 200, at least one motor 300, and a bridge crane 400. In one embodiment, the bridge crane 400 includes a crane bridge and a crane trolley. The bridge crane system 1000 uses a plurality of motors to drive different cranes of the bridge crane 400. In other embodiments, the bridge crane system 1000 uses only one motor to drive the bridge crane 400 having a single crane. Therefore, the number of the motors is not limited in the present disclosure. In addition, the bridge crane 400 is usually controlled to perform a simple pendulum movement.

The user may use the operation apparatus 100, such as a remote controller, a calculator, a computer, or so on to provide an operation command f0 to the inverter 200. The operation command f0 includes information such as movement command, movement direction, given frequency, and acceleration/deceleration time, but the present disclosure is not limited thereto. As shown in FIG. 1, the inverter 200 includes an anti-sway control unit 220, a voltage/frequency (v/f) open-loop control unit 240, and a drive unit 260. The anti-sway control unit 220 outputs an anti-sway frequency command f1 to the v/f open-loop control unit 240 according to the operation command f0. The v/f open-loop control unit 240 performs a voltage/frequency open-loop control (referred to as a v/f open-loop control) to the drive unit 260 according to the anti-sway frequency command f1 so that the drive unit 260 generates a drive voltage signal $v_r$ and a drive frequency signal $f_r$ to drive (operate) the at least one motor 300. In particular, the v/f open-loop control belongs to the technology well known to those of ordinary skill in the art, and therefore the detail description thereof is omitted here for conciseness. In general, the drive unit 260 may be a drive circuit with a plurality of switches, power converters, etc., but the present disclosure is not limited thereto.

Therefore, the focus of the present disclosure is how to generate the anti-sway frequency command f1 to optimize the v/f open-loop control to reduce the sway phenomenon of the bridge crane. Please refer to FIG. 1, FIG. 2, FIG. 3, FIG. 4A, FIG. 4B, FIG. 5A, and FIG. 5B to explain the control method of the first embodiment of the present disclosure.

Figure 2:
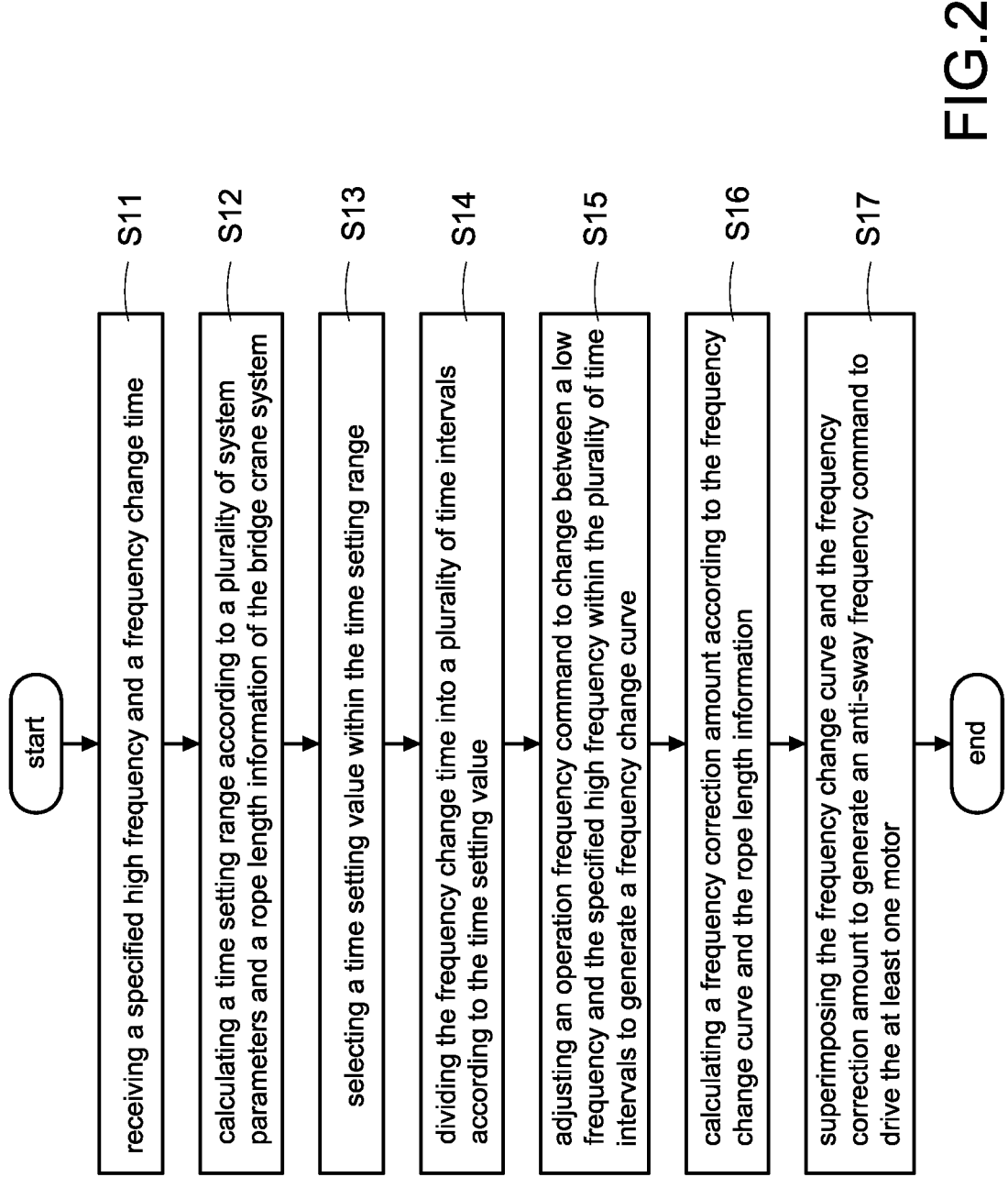
FIG. 2 is a flowchart of a full-time anti-sway control method of the bridge crane system based on an inverter according to a first embodiment of the present disclosure.

In the step (S11) shown in FIG. 2, a time frequency processing module 220a (shown in FIG. 3) of the anti-sway control unit 220 receives the operation command f0 provided from the operation apparatus 100. In particular, the operation command f0 includes, for example, but not limited to, a specified high frequency fh and a time setting value (such as an acceleration time T1 or a deceleration time T3 shown in FIG. 5A), and a frequency change time T0 is preset in the inverter 200. In other embodiments, the operation command f0 includes, for example, but not limited to, the specified high frequency fh, the time setting value (T1 or T3), and/or the frequency change time T0, but the present disclosure is not limited thereto.

In the step (S12) shown in FIG. 2, the time frequency processing module 220a calculates a time setting range according to a plurality of system parameters and a rope length information L of the bridge crane system 1000. In one embodiment, the plurality of the system parameters includes a system inertia of the bridge crane system 1000, and a rated speed and a rated torque of the motor 300. In particular, the plurality of system parameters and the rope length information L of the bridge crane system 1000 are program setting values preset in the inverter 200. In one embodiment, the present disclosure provides users to set the acceleration and deceleration time of the bridge crane system 1000 by themselves so that the acceleration and deceleration time of the bridge crane system 1000 can be flexibly designed under the conditions of inverter overcurrent limit and anti-sway control allowable time. However, the acceleration and deceleration time of the bridge crane system 1000 needs to be designed within a reasonable time setting range. The following continues to describe how to acquire the time setting range in the step (S12).

The time frequency processing module 220a calculates a lower limit value of the time setting range according to the system parameters of the bridge crane system 1000. Please refer to the following equation (1).

$$t_{acc/dec} \geq \frac{J_{sys} \times \omega_{rate}}{2T_{rate}} \qquad \text{equation (1)}$$

In the equation (1), $t_{acc/dec}$ is the time setting range; $\omega_{rate}$ is the rated speed; $T_{rate}$ is the rated torque; $J_{sys}$ is the system inertia. Afterward, the time frequency processing module 220a calculates the natural swing period of a simple pendulum according to the rope length information L of the bridge crane 400. Please refer to the following equation (2).

$$T_{swing} = 2\pi\sqrt{\frac{L}{g}} \qquad \text{equation (2)}$$

In the equation (2), $T_{swing}$ is the natural swing period; g is the acceleration of gravity; L is the rope length information. Afterward, the time frequency processing module 220a calculates an upper limit value of the time setting range according to the natural swing period. Please refer to the following equation (3).

$$t_{acc/dec} \leq \frac{0.9 T_{swing}}{2} \qquad \text{equation (3)}$$

In the equation (3), $t_{acc/dec}$ is the time setting range; $T_{swing}$ is the natural swing period. Therefore, the time setting range can be reasonably inferred by the combination of equations (1), (2), and (3).

In the step (S13) shown in FIG. 2, the user may select the appropriate time setting values within the time setting range through the time frequency processing module 220a, and the selected time setting values are used as the acceleration and deceleration time of the bridge crane system 1000. Please refer to FIG. 5A, the selected time setting values are used as the acceleration time T1 and the deceleration time T3. In one preferred embodiment, the acceleration time T1 and the deceleration time T3 are the same, but the present disclosure is not limited thereto.

Figures 5A, 5B:
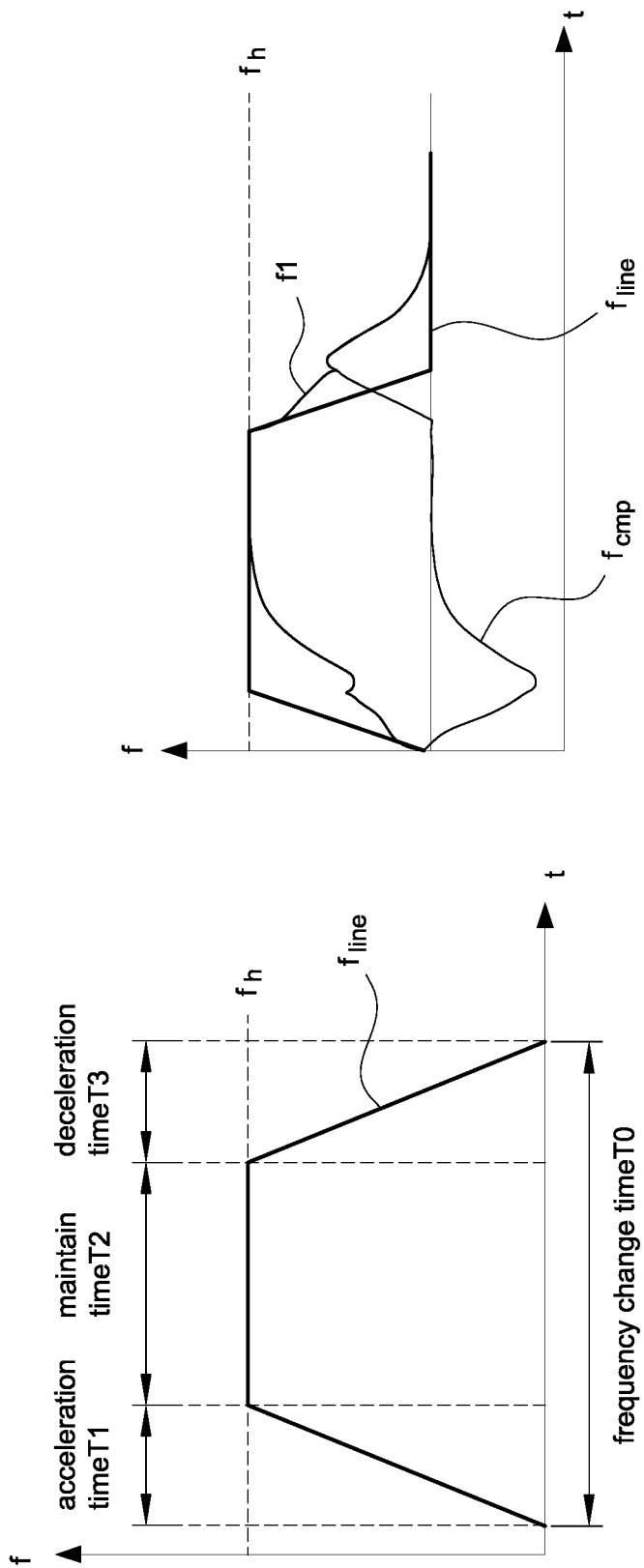
FIG. 5A is a schematic curve of an optimal frequency change of the full-time anti-sway control of the bridge crane system according to the first embodiment of the present disclosure.
FIG. 5B is a schematic curve of an optimal anti-sway frequency command of the full-time anti-sway control of the bridge crane system according to the first embodiment of the present disclosure.

In the step (S14) shown in FIG. 2, the time frequency processing module 220a divides the frequency change time T0 into multiple time intervals (as shown in FIG. 5A) according to the time setting values selected in the step (S12). The multiple time intervals include the acceleration time T1, the maintain time T2, and the deceleration time T3. In one embodiment, as shown in FIG. 5A, the selected time setting values may be used as the acceleration time T1 and the deceleration time T3, and the acceleration time T1 and the deceleration time T3 are the same. Therefore, the maintain time T2 can be inferred based on the frequency change time T0, the acceleration time T1, and the deceleration time T3. In other words, multiple maintain times T2 within the multiple time intervals can be acquired according to the frequency change time T0 and the time setting values. The multiple maintain times T2 are between the acceleration time T1 and the deceleration time T3. In particular, in the present disclosure, the user selects the time setting values within the time setting range to set the acceleration time T1 and the deceleration time T3. However, the user cannot operate the time of starting or stopping the bridge crane system 1000.

In the step (S15) shown in FIG. 2, the time frequency processing module 220a adjusts an operation frequency command to change between a low frequency (such as 0 Hz) and the specified high frequency $f_h$ within multiple time intervals T1-T3 so as to generate a frequency change curve $f_{line}$ (as shown in FIG. 5A). In particular, the operation frequency command is a signal generated in the time frequency processing module 220a in advance, or a signal preset in the time frequency processing module 220a.

In one embodiment, as shown in FIG. 5A, in the acceleration time T1, the frequency change curve $f_{line}$ linearly increases from the low frequency to the specified high frequency $f_h$. In the maintain time T2, the frequency change curve $f_{line}$ maintains at the specified high frequency $f_h$. In fact, frequency change curve $f_{line}$ oscillates within an error range of the specified high frequency $f_h$. In the deceleration time T3, the frequency change curve $f_{line}$ linearly decreases from the specified high frequency $f_h$ to the low frequency, but the present disclosure is not limited thereto. In other words, the frequency change curve $f_{line}$ linearly increases from the low frequency (such as 0 Hz) to the specified high frequency $f_h$, maintains at the specified high frequency $f_h$, and linearly decreases from the specified high frequency $f_h$ to the low frequency.

Figure 3:
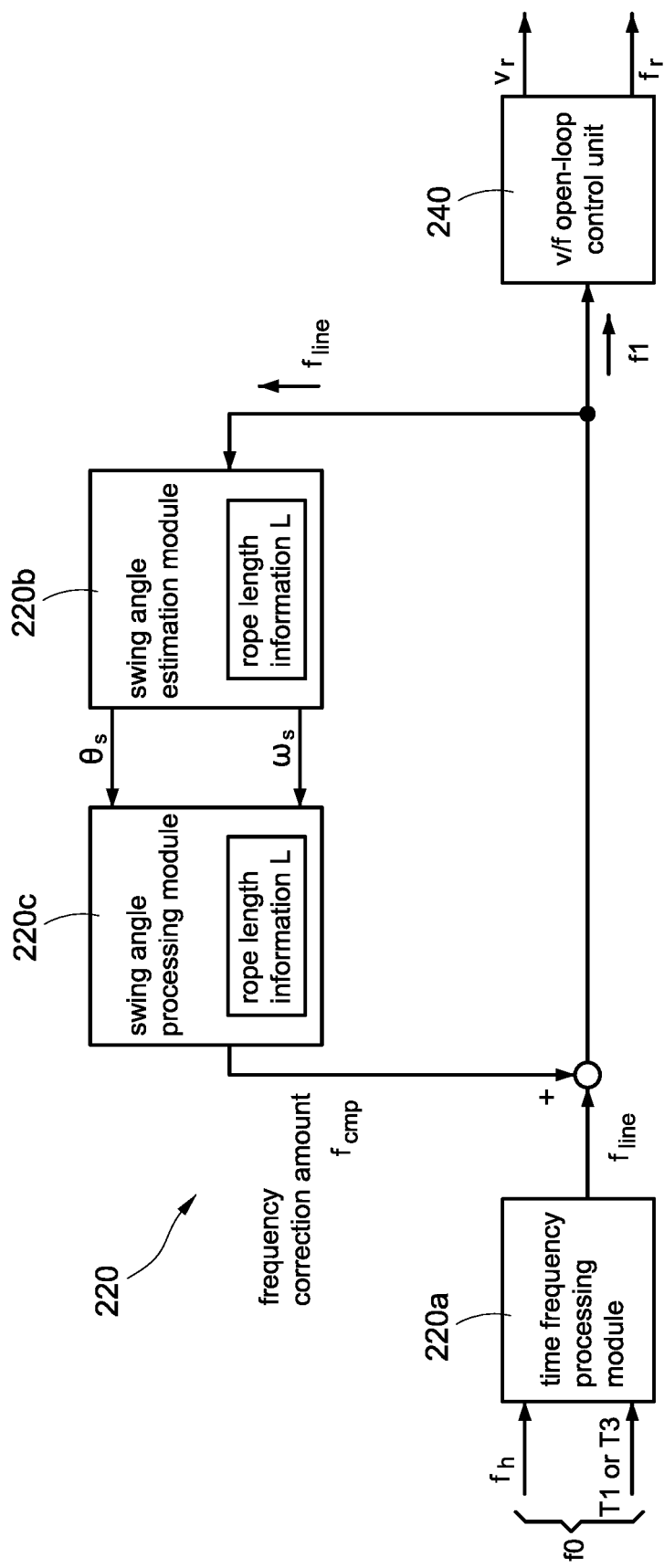
FIG. 3 is a structure diagram of an anti-sway controller in FIG. 1.

As shown in FIG. 3, the anti-sway control unit 220 includes a swing angle estimation module 220b and a swing angle processing module 220c. Please refer to FIG. 2 and FIG. 3, in the step (S16), the swing angle estimation module 220b and the swing angle processing module 220c calculate a frequency correction amount $f_{cmp}$ according to the frequency change curve $f_{line}$ and the preset rope length information L. The calculation method of the frequency correction amount $f_{cmp}$ will be detailed below.

Figure 4B:
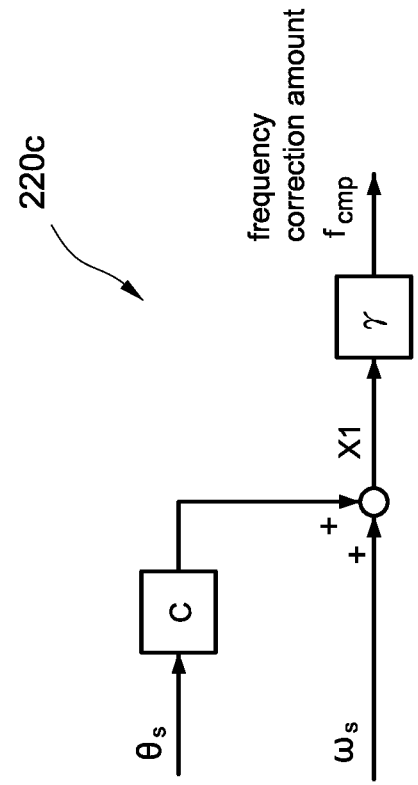
FIG. 4B is a schematic block diagram of a swing angle processing module of the full-time anti-sway control of the bridge crane system according to the first embodiment of the present disclosure.
Figure 4A:
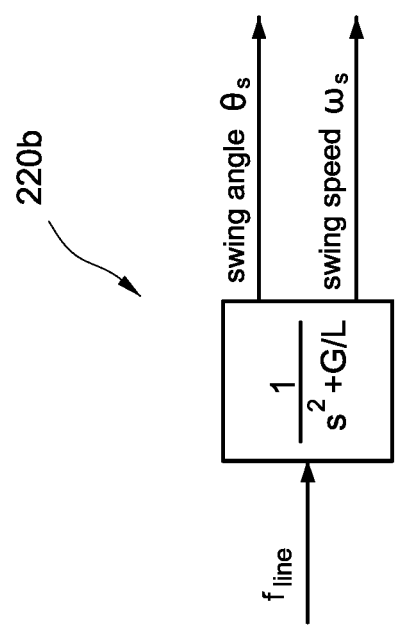
FIG. 4A is a schematic block diagram of a swing angle estimation module of the full-time anti-sway control of the bridge crane system according to the first embodiment of the present disclosure.

Please refer to FIG. 2 (S16), FIG. 3, and FIG. 4A, the swing angle estimation module 220b firstly receives the frequency change curve $f_{line}$ outputted from the time frequency processing module 220a. The swing angle estimation module 220b calculates a frequency change amount of the operation frequency command within the frequency change time T0 according to the frequency change curve $f_{line}$. Please refer to FIG. 5A, the frequency on the vertical axis represents the speed, and the acceleration (that is, the frequency change amount) may be acquired by differentiating the speed once (i.e., the frequency change amount). However, the calculation method of the frequency change amount of the present disclosure is not limited to the above-mentioned method.

Afterward, the swing angle estimation module 220b calculates a swing angle $\theta_s$ of the bridge crane 400 under the simple pendulum movement according to the rope length information L and the frequency change amount. Please refer to the following equation (4).

$$\theta_s = \frac{1}{s^2 + G/L} \times \frac{\Delta f}{L} \qquad \text{equation (4)}$$

In the equation (4), $\theta_s$ is the swing angle; s is a Laplace operator; G is a gravitational acceleration constant; L is the rope length information; $\Delta f$ is the frequency change amount. Afterward, the swing angle estimation module 220b calculates a swing speed $\omega_s$ of the bridge crane 400 under the simple pendulum movement according to the swing angle $\theta_s$. In some embodiments, the swing angle estimation module 220b differentiates the swing angle $\theta_s$ to acquire the swing speed $\omega_s$ of the bridge crane 400 under the simple pendulum movement. The swing angle estimation module 220b provides the swing angle $\theta_s$ and the swing speed $\omega_s$ to the swing angle processing module 220c.

Please refer to FIG. 2 (S15), FIG. 3, and FIG. 4B, the swing angle processing module 220c includes a first control parameter C and a second control parameter $\gamma$. The swing angle processing module 220c firstly calculates a control variable X1 according to the swing angle $\theta_s$, the swing speed $\omega_s$, and the first control parameter C. Please refer to the following equation (5).

$$X1 = C\theta_s + \omega_s \qquad \text{equation (5)}$$

Afterward, the swing angle processing module 220c multiplies the control variable X1 with the second control parameter $\gamma$ to calculate a rotation speed correction amount $\omega_{cmp}$. Please refer to the following equation (6).

$$\omega_{cmp} = \gamma \times X1 \qquad \text{equation (6)}$$

After the swing angle processing module 220c calculates the rotation speed correction amount $\omega_{cmp}$, the frequency correction amount $f_{cmp}$ can be calculated according to the following equation (7).

$$f_{cmp} = \frac{\omega_{cmp} \times P}{120} \qquad \text{equation (7)}$$

The following will continue to introduce an embodiment of the present disclosure for designing the first control parameter C and the second control parameter $\gamma$. In general, the bridge crane system 1000 may be simplified into a second-order control system, as the following equation (8).

$$\frac{\theta_s}{f^*} = \frac{s}{L(\gamma+1)\left(s^2 + \frac{L\gamma C}{L(\gamma+1)}s + \frac{g}{L(\gamma+1)}\right)} = \frac{\omega_n^2}{s^2 + 2\zeta\omega_n s + \omega_n^2} \qquad \text{equation (8)}$$

In the equation (8), L is the rope length information; $\theta_s$ is the swing angle; f* is a frequency command; $\zeta$ is a damping coefficient; $\omega_n$ is a bandwidth. In particular, the frequency command (f*) is the equation (8) is the frequency change curve $f_{line}$ in FIG. 5A. Afterward, the equation (8) is transformed into a standard second-order equation to derive the equation (9) and the equation (10) as follows.

$$2\zeta\omega_n = \frac{L\gamma C}{L(\gamma+1)} \qquad \text{equation (9)}$$

$$\omega_n^2 = \frac{G}{L(\gamma+1)} \qquad \text{equation (10)}$$

After adjusting the equation (9) and the equation (10), the first control parameter C and the second control parameter $\gamma$ can be inferred, as shown in the following equation (11) and equation (12).

$$\gamma = \frac{G}{L\omega_n^2} - 1 > 0 \qquad \text{equation (11)}$$

$$C = \frac{2\zeta\omega_n G}{G - \omega_n^2 L} > 0 \qquad \text{equation (12)}$$

According to the equation (11) and the equation (12), the first control parameter C and the second control parameter $\gamma$ can be acquired by designing different damping coefficients $\zeta$ and bandwidths $\omega_n$. In one preferred embodiment, a range of the damping coefficient $\zeta$ is between 0.1 and 1 ($\zeta \in (0.1, 1)$), and the bandwidth $\omega_n$ is shown in the following equation (13).

$$\omega_n = n \times \omega_{swing} = n \times \sqrt{G/L} \qquad \text{equation (13)}$$

In the equation (13), $\omega_{swing}$ is a swing frequency of the bridge crane 400; n is a bandwidth ratio. In particular, the swing frequency $\omega_{swing}$ of the bridge crane 400 is derived by the natural swing period $T_{swing}$ (such as the equation (2)) of the bridge crane 400.

In the present disclosure, the damping coefficient $\zeta$ and the bandwidth ratio n are designed by users to adjust to meet the requirements of controlling the system. In particular, by designing different damping coefficients $\zeta$, the anti-sway system rigidity can be adjusted, and by designing different bandwidth ratios n, the response speed (strength) can be adjusted.

Figure 6:
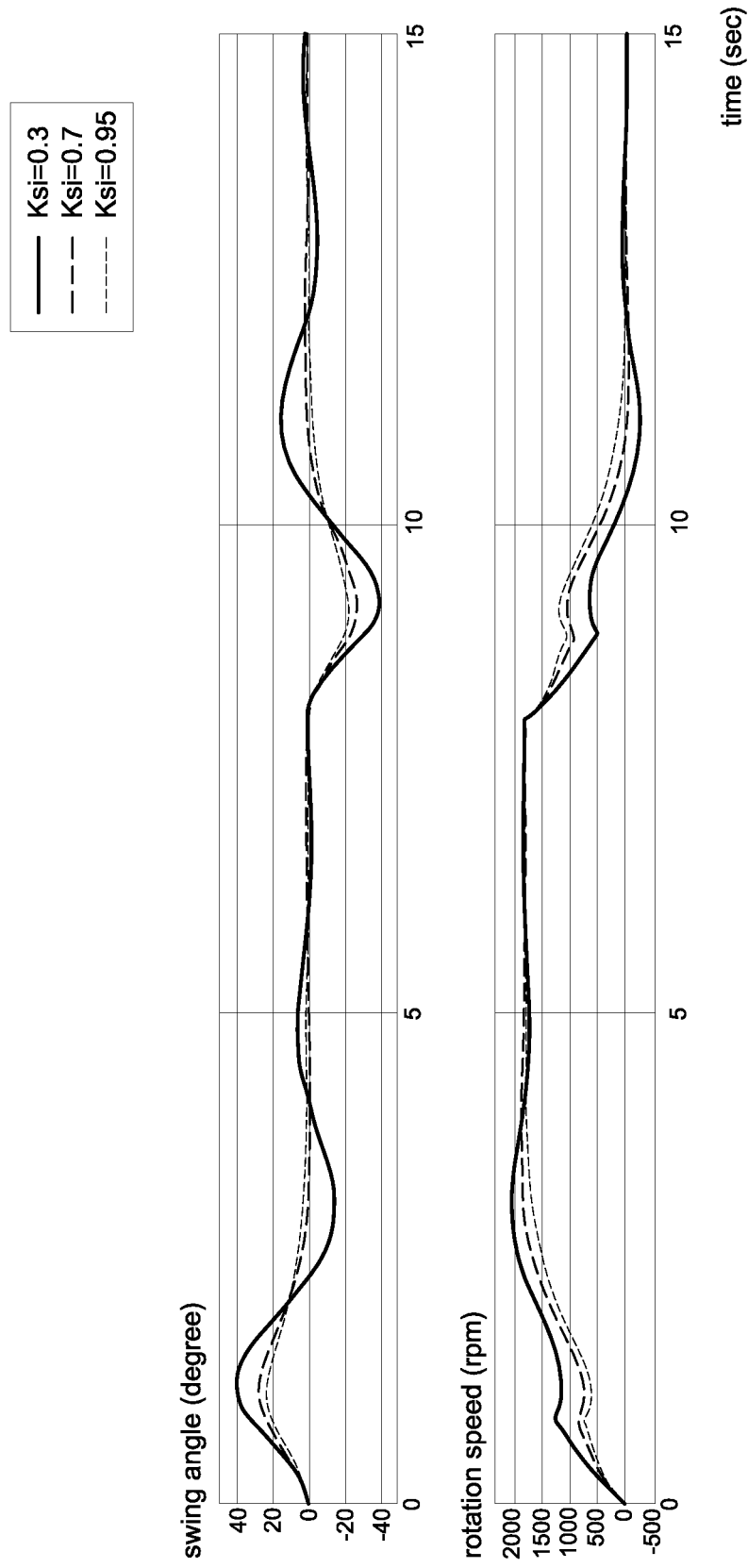
FIG. 6 is a schematic curve of the response of different damping coefficients to a swing angle and a motor speed according to the present disclosure.
Figure 8:
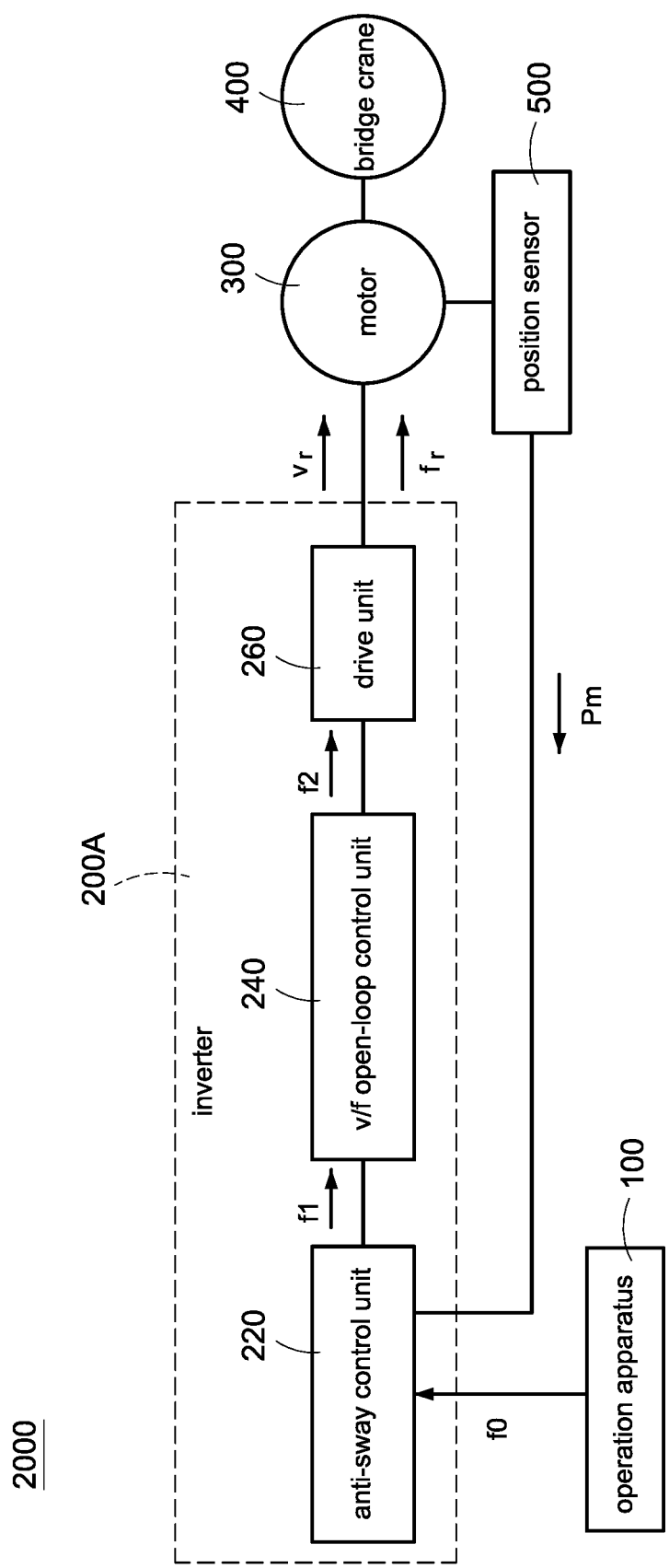
FIG. 8 is a structure diagram of the full-time anti-sway control of the bridge crane system according to a second embodiment of the present disclosure.

As shown in FIG. 6, which shows a schematic curve of the response of different damping coefficients to a swing angle and a motor speed according to the present disclosure. In FIG. 8, when the damping coefficient $\zeta$ is smaller, the degree of suppression of the swing angle is smaller, and the maximum overshoot of the motor speed is larger. On the contrary, when the damping coefficient $\zeta$ is larger, the degree of suppression of the swing angle is larger, and the maximum overshoot of the motor speed is smaller. Therefore, when the motor decelerates, the larger the damping coefficient $\zeta$, the less likely it is to reverse rotation. In general, the damping coefficient $\zeta$ may be set at a relatively intermediate value at the factory ($\zeta$=0.707). However, the design of the damping coefficient $\zeta$ may be adjusted according to the user's operating habits and preferences. Since the effect of the damping coefficient ζ may be compared to the shock-absorbing effect of a vehicle, if the damping coefficient ζ is small, the amount of shaking will be more obvious.

Figure 7:
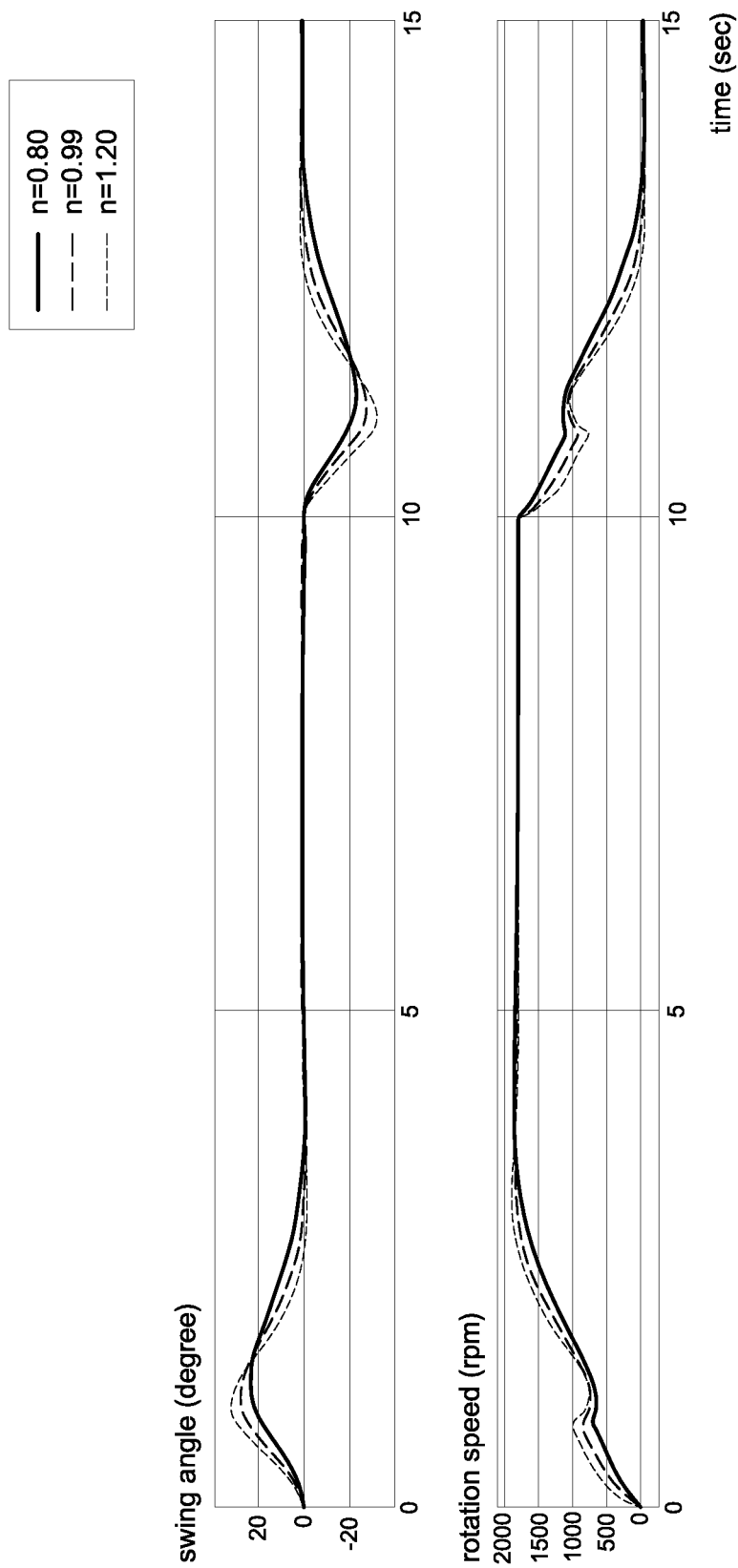
FIG. 7 is a schematic curve of the response of different bandwidth ratios to the swing angle and the motor speed according to the present disclosure.
Figure 9:
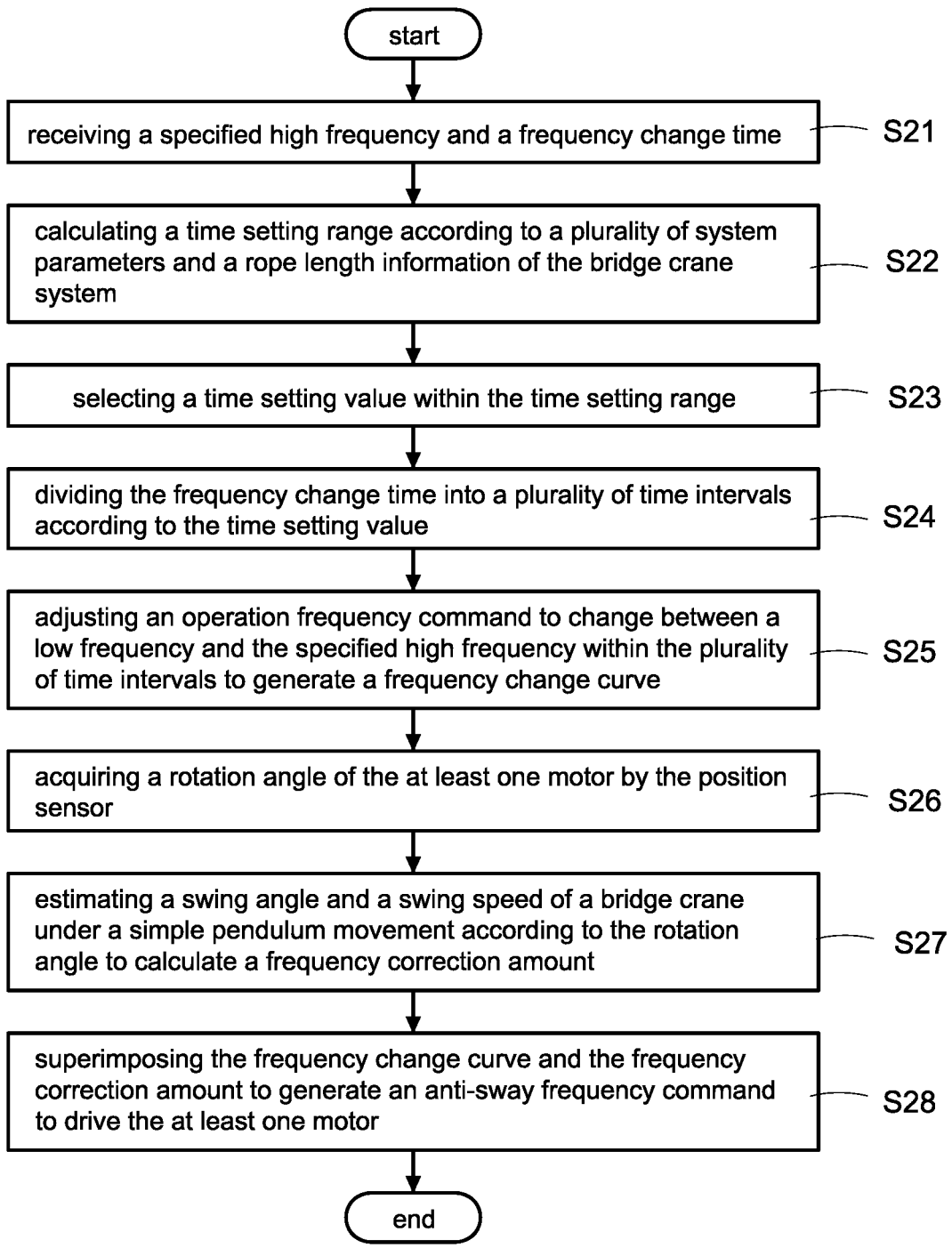
FIG. 9 is a flowchart of the full-time anti-sway control method of the bridge crane system based on the inverter according to a second embodiment of the present disclosure.

As shown in FIG. 7, which shows a schematic curve of the response of different bandwidth ratios to the swing angle and the motor speed according to the present disclosure. In FIG. 9, when the bandwidth ratio n is larger, an anti-sway time (that is, the time from the start of deceleration to the speed reaching a steady state) is relatively small. On the contrary, when the bandwidth ratio n is smaller, the anti-sway time is relatively large. Under the principle of reasonable swing angle, the larger the bandwidth ratio n, the faster the speed of compensating the swing angle (zero), i.e., returning to the steady state faster), and the swing will be more severe.

By the combination of equations (2), (11), (12), and (13), the design method of the first control parameter C and the second control parameter γ has the following steps. According to the natural swing period $T_{swing}$, the response frequency (referred to as the bandwidth $\omega_n$) is calculated. According to the response frequency (i.e., the bandwidth $\omega_n$), the damping coefficient ζ, and the rope length information L, the first control parameter C is calculated. According to the response frequency (i.e., the bandwidth $\omega_n$) and the rope length information L, the second control parameter γ is calculated. In particular, the first control parameter C and the second control parameter γ may be preset in the swing angle processing module 220c after calculation by the user, but the present disclosure is not limited thereto.

Please refer to FIG. 1, FIG. 2 (S17), FIG. 3, and FIG. 5B, the inverter 200 superimposes the frequency change curve fine and the frequency correction amount $f_{cmp}$ generated by the swing angle processing module 220c to generate an anti-sway frequency command f1 to drive the at least one motor 300. As shown in FIG. 5B, since the frequency change curve fine and the frequency correction amount $f_{cmp}$ are superimposed to generate the anti-sway frequency command f1, the anti-sway frequency command f1 nonlinearly increases from a low frequency (for example, but not limited to 0 Hz) to a specified high frequency $f_h$. After the anti-sway frequency command f1 maintains at the specified high frequency $f_h$ for a period of time, the anti-sway frequency command f1 nonlinearly decreases from the specified high frequency $f_h$ to the low frequency.

Please refer to FIG. 8, the bridge crane system 2000 includes an operation apparatus 100, an inverter 200A, at least one motor 300, a bridge crane 400, and a position sensor 500. The inverter 200A includes an anti-sway control unit 230, a voltage/frequency (v/f) open-loop control unit 240, and a drive unit 260. Please refer to FIG. 10, the anti-sway control unit 230 includes a time frequency processing module 220a, a frequency estimation module 231, a swing angle estimation module 220b, and a swing angle processing module 220c. In the second embodiment, the position sensor 500 is used to detect/sense the motor 300, and outputs a motor position signal Pm to the anti-sway control unit 230. The anti-sway control unit 230 generates an anti-sway frequency command f1 to the v/f open-loop control unit 240 according to the motor position signal Pm. Please refer to FIG. 8, FIG. 9, and FIG. 10 to explain the control method of the second embodiment of the present disclosure.

In the second embodiment, the time frequency processing module 220a performs the steps (S21) to (S25) to generate the frequency change curve fine (as shown in FIG. 5A). In particular, the operation method of steps (S21) to (S25) in FIG. 9 is the same as that of steps (S11) to (S15) in FIG. 2, and the detail description is omitted here for conciseness.

Figure 10:
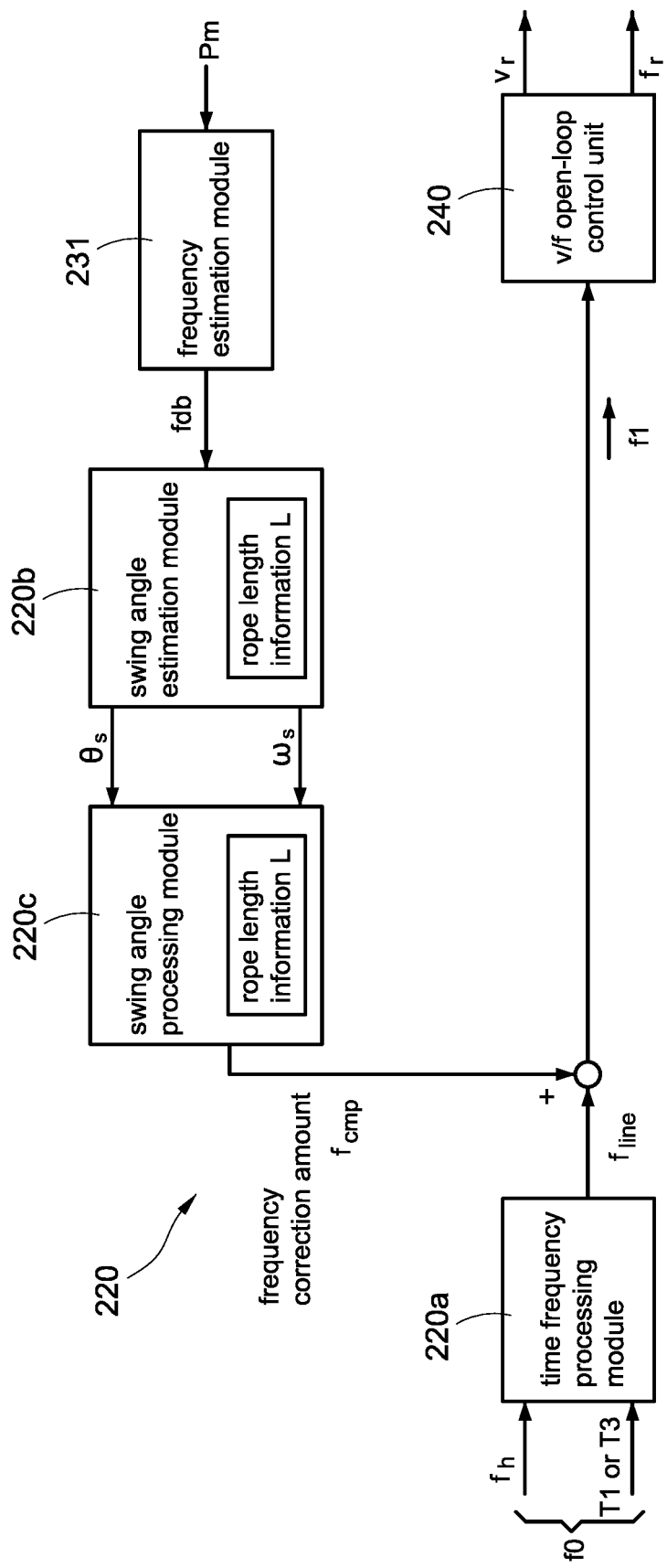
FIG. 10 is a structure diagram of the anti-sway controller in FIG. 8.

Please refer to FIG. 9 (S26) and FIG. 10, the anti-sway control unit 230 acquires a rotation angle of the motor 300 according to the motor position signal Pm outputted from the position sensor 500.

Please refer to FIG. 9 (S27) and FIG. 10, the anti-sway control unit 230 estimates the swing angle $\theta_s$ and the swing speed $\omega_s$ of the bridge crane 400 under the simple pendulum movement according to the rotation angle of the motor 300 so as to calculate the frequency correction amount $f_{cmp}$. In this embodiment, the frequency estimation module 231 differentiates the rotation angle of the motor 300 to acquire the rotation speed of the motor 300, and uses the rotation speed of the motor 300 as an electrical frequency command fdb. The frequency estimation module 231 outputs the electrical frequency command fdb to the swing angle estimation module 220b.

Afterward, the swing angle estimation module 220b differentiates the electrical frequency command fdb once to acquire the frequency change amount (i.e., the acceleration) so as to estimate the swing angle $\theta_s$ and the swing speed $\omega_s$. The method of estimating the swing angle $\theta_s$ has been described in the previous paragraph, please refer to equation (4). The swing angle estimation module 220b differentiates the swing angle $\theta_s$ to acquire the swing speed $\omega_s$. Afterward, the swing angle estimation module 220b outputs the swing angle $\theta_s$ and the swing speed $\omega_s$ to the swing angle processing module 220c. The swing angle processing module 220c calculates the frequency correction amount $f_{cmp}$ according to the above-mentioned equations (5) to (13).

Please refer to FIG. 9 (S28) and FIG. 10, the inverter 200A superimposes the frequency change curve fine and the frequency correction amount $f_{cmp}$ generated by the swing angle processing module 220c to generate an anti-sway frequency command f1 to drive the at least one motor 300. In particular, the waveform of the anti-sway frequency command f1 is shown in FIG. 5B.

Figure 11:
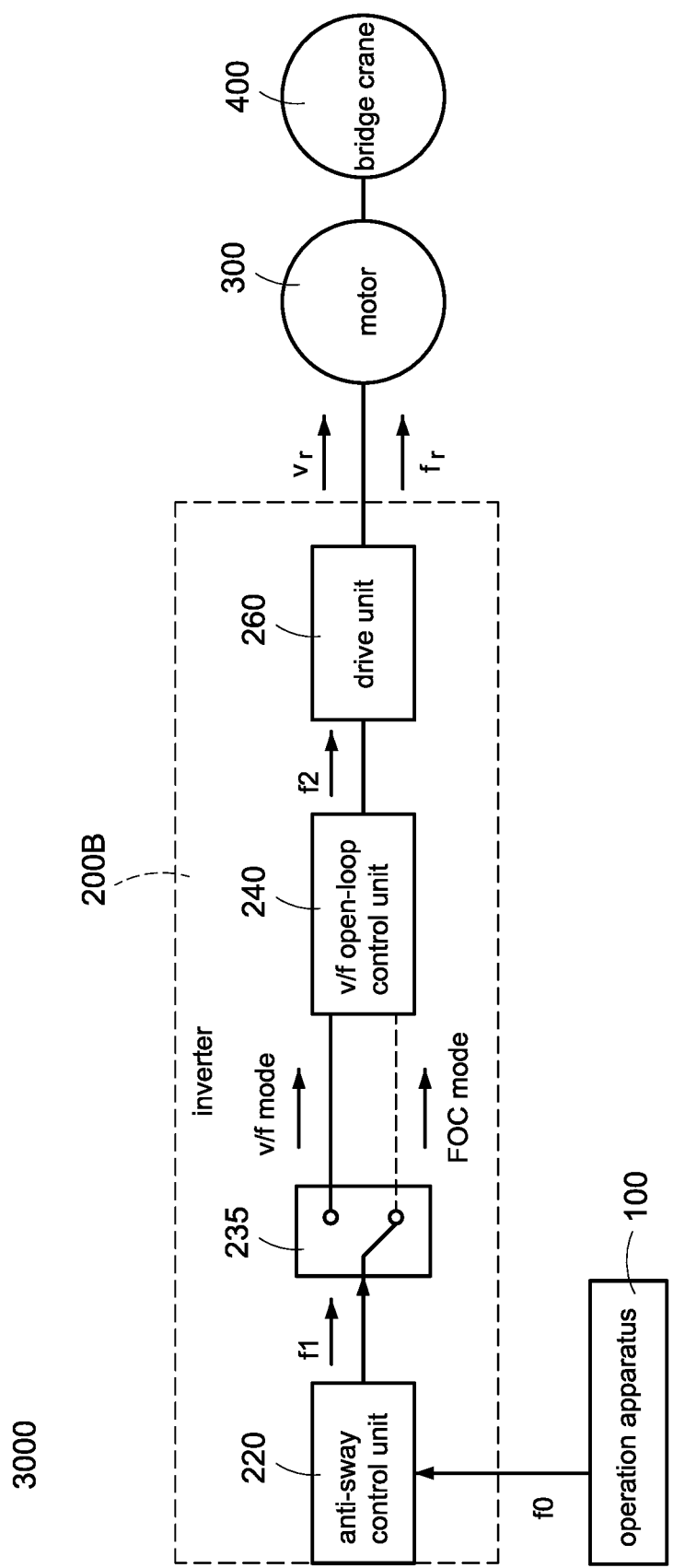
FIG. 11 is a structure diagram of the bridge crane system having a drive mode switch according to the present disclosure.

The anti-sway control structure of the present disclosure may also use a drive mode switch 235 to select the power unit applied to the motor with/without the position sensor to configure to the bridge crane structure, and to switch the drive mode according to the actual hardware configuration to provide the flexibility in use, as shown in FIG. 11.

In summary, the anti-sway control structure proposed in the present disclosure may be used for the bridge crane system having the motor without position sensor, such as an incremental encoder, an absolute encoder, or a Hall sensor, and swing angle sensor, such as an angle sensor, a gyroscope, an inclinometer, and an image recognizer. In addition, the anti-sway control structure proposed in the present invention does not require too many other bridge crane system parameters (for example, the equivalent radius of the rotation to line, and the number of motor rotors). The present disclosure only needs low-cost power unit configuration and v/f drive control mode to linearly move the anti-sway control structure, and can perform full-time anti-sway during operation, even if the inching movement command is executed, it also has the effect of the anti-sway control. Whether using the v/f control or the vector control (FOC) requiring rotor information, the full-time anti-sway performance can be achieved through the control method of the present disclosure. The present disclosure uses the motor input frequency as the input source of the swing angle estimation module 220b (or referred to as a swing angle estimator) under the v/f control so that the anti-sway control unit has the characteristics of stability and no additional filter design is required.

The swing angle estimation module 220b of the present disclosure can estimate the swing angle of the hanging object or the hook without relying on the weight of the long travel, the trolley, and the hanging object, and without the gear ratio of the reduction box and the wheel diameters of the long travel and the trolley.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A full-time anti-sway control method of a bridge crane system based on an inverter structure, the bridge crane system comprising an inverter for performing the control method and at least one motor controlled by the control method, the control method comprising steps of:
    receiving a specified high frequency command and a frequency change time, wherein the frequency change time is an acceleration and deceleration time,
    calculating a time setting range according to a plurality of system parameters and a rope length information of the bridge crane system, wherein the time setting range is the acceleration and deceleration time, wherein $$t_{acc/dec} \geq \frac{J_{sys} \times \omega_{rate}}{2T_{rate}} \text{ and } t_{acc/dec} \leq \frac{0.9T_{swing}}{2},$$

where $t_{acc/dec}$ is the time setting range, $\omega_{rate}$ is a rated speed, $T_{rate}$ is a rated torque, $J_{sys}$ is a system inertia, $T_{swing}$ is a natural swing period,
    selecting a time setting value within the time setting range,
    dividing the frequency change time into a plurality of time intervals according to the time setting value,
    adjusting an operation frequency command to change between a low frequency command and the specified high frequency command within the plurality of time intervals to generate a frequency change curve,
    estimating a swing angle and a swing speed by a swing angle estimation module in a sensorless manner according to the frequency change curve, a gravitational acceleration constant, and the rope length information,
    designing a swing angle processing module according to the gravitational acceleration constant and the rope length information,
    generating a frequency correction amount by the swing angle processing module according to the swing angle and the swing speed, and
    superimposing the frequency change curve and the frequency correction amount to generate an anti-sway frequency command to drive the at least one motor.

2. The full-time anti-sway control method as claimed in claim 1, further comprising steps of:
    calculating a lower limit value of the time setting range according to the system parameters of the bridge crane system,
    calculating a natural swing period of a bridge crane under a simple pendulum movement according to the rope length information of the bridge crane system, and
    calculating an upper limit value of the time setting range according to the natural swing period.

3. The full-time anti-sway control method as claimed in claim 1, further comprising steps of:
    using the time setting value as an acceleration time and a deceleration time in the plurality of time intervals, and
    acquiring a maintain time of the plurality of time intervals according to the frequency change time and the time setting value, wherein the maintain time is between the acceleration time and the deceleration time.

4. The full-time anti-sway control method as claimed in claim 3, wherein the frequency change curve linearly increases from the low frequency command to the specified high frequency command, and after the frequency change curve maintains at the maintain time with the specified high frequency command, the frequency change curve linearly decreases from the specified high frequency command to the low frequency command.

5. The full-time anti-sway control method as claimed in claim 2, further comprising:
    calculating a frequency change amount of the operation frequency command within the frequency change time according to the frequency change curve,
    calculating the swing angle of the bridge crane under the simple pendulum movement according to the rope length information and the frequency change amount, and
    calculating the swing speed of the bridge crane under the simple pendulum movement according to the swing angle.

6. The full-time anti-sway control method as claimed in claim 5, further comprising:
    calculating a response frequency according to the natural swing period and a bandwidth ratio,
    calculating a first control parameter according to the response frequency, a damping coefficient, and the rope length information,
    calculating a second control parameter according to the response frequency and the rope length information,
    calculating a control variable according to the swing angle, the swing speed, and the first control parameter,
    multiplying the control variable with the second control parameter to acquire a rotation speed correction amount, and
    acquiring the frequency correction amount according to the rotation speed correction amount.

7. The full-time anti-sway control method as claimed in claim 3, wherein the anti-sway frequency command nonlinearly increases from the low frequency command to the specified high frequency command, and after the anti-sway frequency command maintains at the specified high frequency command for a period of time, the anti-sway frequency command nonlinearly decreases from the specified high frequency command to the low frequency command.

8. A full-time anti-sway control method of a bridge crane system based on an inverter structure, the bridge crane system comprising an inverter for performing the control method, a position sensor, and at least one motor controlled by the control method, the control method comprising steps of:
    receiving a specified high frequency command and a frequency change time, wherein the frequency change time is an acceleration and deceleration time,
    calculating a time setting range according to a plurality of system parameters and a rope length information of the bridge crane system, wherein the time setting range is the acceleration and deceleration time, wherein $$t_{acc/dec} \geq \frac{J_{sys} \times \omega_{rate}}{2T_{rate}} \text{ and } t_{acc/dec} \leq \frac{0.9T_{swing}}{2},$$

where $t_{acc/dec}$ is the time setting range, $\omega_{rate}$ is a rated speed, $T_{rate}$ is a rated torque, $J_{sys}$ is a system inertia, $T_{swing}$ is a natural swing period, selecting a time setting value within the time setting range, dividing the frequency change time into a plurality of time intervals according to the time setting value, adjusting an operation frequency command to change between a low frequency command and the specified high frequency command within the plurality of time intervals to generate a frequency change curve, acquiring a rotation angle of the at least one motor by the position sensor, estimating a swing angle and a swing speed by a swing angle estimation module in a sensorless manner according to the frequency change curve, a gravitational acceleration constant, and the rope length information, designing a swing angle processing module by the gravitational acceleration constant and the rope length information, generating a frequency correction amount by the swing angle processing module according to the swing angle and the swing speed, and superimposing the frequency change curve and the frequency correction amount to generate an anti-sway frequency command to drive the at least one motor.

9. The full-time anti-sway control method as claimed in claim 8, further comprising steps of:
  calculating a lower limit value of the time setting range according to the system parameters of the bridge crane system,
  calculating a natural swing period of the bridge crane under the simple pendulum movement according to the rope length information of the bridge crane system, and
  calculating an upper limit value of the time setting range according to the natural swing period.

10. The full-time anti-sway control method as claimed in claim 8, further comprising steps of:
  using the time setting value as an acceleration time and a deceleration time in the plurality of time intervals, and
  acquiring a maintain time of the plurality of time intervals according to the frequency change time and the time setting value, wherein the maintain time is between the acceleration time and the deceleration time.

11. The full-time anti-sway control method as claimed in claim 10, wherein the frequency change curve linearly increases from the low frequency command to the specified high frequency command, and after the frequency change curve maintains at the maintain time with the specified high frequency command, the frequency change curve linearly decreases from the specified high frequency command to the low frequency command.

12. The full-time anti-sway control method as claimed in claim 9, further comprising:
  calculating a frequency change amount of the operation frequency command within the frequency change time according to the frequency change curve,
  calculating the swing angle of the bridge crane under the simple pendulum movement according to the rope length information and the frequency change amount, and
  calculating the swing speed of the bridge crane under the simple pendulum movement according to the swing angle.

13. The full-time anti-sway control method as claimed in claim 12, further comprising:
  calculating a response frequency according to the natural swing period and a bandwidth ratio,
  calculating a first control parameter according to the response frequency, a damping coefficient, and the rope length information,
  calculating a second control parameter according to the response frequency and the rope length information,
  calculating a control variable according to the swing angle, the swing speed, and the first control parameter,
  multiplying the control variable with the second control parameter to acquire a rotation speed correction amount, and
  acquiring the frequency correction amount according to the rotation speed correction amount.

14. The full-time anti-sway control method as claimed in claim 10, wherein the anti-sway frequency command nonlinearly increases from the low frequency command to the specified high frequency command, and after the anti-sway frequency command maintains at the specified high frequency command for a period of time, the anti-sway frequency command nonlinearly decreases from the specified high frequency command to the low frequency command.

* * * * *